US010980014B2

(12) United States Patent
Takeda et al.

(10) Patent No.: US 10,980,014 B2
(45) Date of Patent: Apr. 13, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN); Na Li, Beijing (CN); Yong Li, Beijing (CN); Wenbo Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/337,297

(22) PCT Filed: Sep. 29, 2017

(86) PCT No.: PCT/JP2017/035391
§ 371 (c)(1),
(2) Date: Mar. 27, 2019

(87) PCT Pub. No.: WO2018/062461
PCT Pub. Date: Apr. 5, 2018

(65) Prior Publication Data
US 2019/0230635 A1    Jul. 25, 2019

(30) Foreign Application Priority Data

Sep. 29, 2016  (JP) ................................ 2016-192338

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1861* (2013.01); *H04W 28/04* (2013.01);
(Continued)

(58) Field of Classification Search
CPC ........... H04W 72/0446; H04W 72/042; H04W 72/12; H04W 72/0413; H04W 72/1294;
(Continued)

(56) References Cited

U.S. PATENT DOCUMENTS

2006/0279409 A1\* 12/2006 Yang .................. G06K 7/10019
340/10.2
2010/0316096 A1    12/2010 Adjakple et al.
(Continued)

FOREIGN PATENT DOCUMENTS

EP           3151460 A1    4/2017
JP        2012-530470 A   11/2012

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
(Continued)

*Primary Examiner* — Phuc H Tran
(74) *Attorney, Agent, or Firm* — Osha Bergman Watanabe & Burton LLP

(57) ABSTRACT

The present invention is designed so that, when special subframes are allowed to transmit a PUSCH, the transmission of the PUSCH can be controlled adequately. According to the present invention, a user terminal has a receiving section that receives downlink control information (DCI) that schedules an uplink (UL) shared channel, and a control section that controls transmission of the UL shared channel by using a table that associates a subframe, in which the DCI is received, and a timing, at which the UL shared channel is transmitted, per UL/downlink (DL) configuration. The transmission timing in the table is determined based on a special subframe, which is allowed to transmit the UL shared
(Continued)

channel, and a predetermined reference value, which is lower than 4 ms.

6 Claims, 25 Drawing Sheets

(51) Int. Cl.
H04W 28/04 (2009.01)
H04W 72/12 (2009.01)
H04W 28/06 (2009.01)
(52) U.S. Cl.
CPC .......... H04W 28/06 (2013.01); H04W 72/04 (2013.01); H04W 72/12 (2013.01)
(58) Field of Classification Search
CPC ... H04W 74/08; H04W 74/085; H04W 76/11; H04W 84/00; H04W 28/04; H04W 28/06; H04W 72/04; H04L 5/00; H04L 5/0053; H04L 5/1469; H04L 5/0044; H04L 5/0051; H04L 5/0094; H04L 1/1861; H04L 1/1887; H04L 2001/0097; H04B 7/15542
See application file for complete search history.

(56) References Cited

U.S. PATENT DOCUMENTS

| 2017/0105212 | A1* | 4/2017 | Li | H04L 5/0053 |
| 2018/0191547 | A1* | 7/2018 | Mukherjee | H04W 72/0446 |
| 2018/0242317 | A1* | 8/2018 | Marinier | H04W 72/0446 |
| 2019/0097779 | A1* | 3/2019 | Wu | H04L 1/1858 |
| 2019/0342865 | A1* | 11/2019 | Shin | H04L 5/0051 |
| 2020/0288461 | A1* | 9/2020 | Hwang | H04L 5/0055 |

OTHER PUBLICATIONS

Qualcomm Incorporated; "PUSCH in UpPTS"; 3GPP TSG RAN WG1 #86, R1-166294; Gothenburg, Sweden, Aug. 22-26, 2016 (8 Pages).

ZTE Corp, ZTE Microelectronics; "HARQ with shortened processing time for 1ms TTI"; 3GPP TSG RAN WG1 Meeting #86, R1-167577; Gothenburg, Sweden, Aug. 22-26, 2016 (9 Pages).

International Search Report issued in PCT/JP2017/035391 dated Dec. 19, 2017 (2 Pages).

Written Opinion of the International Searching Authority issued in PCT/JP2017/035391 dated Dec. 19, 2017 (4 Pages).

Extended European Search Report issued in counterpart European Patent Application No. 17856410.0, dated Apr. 1, 2020 (8 pages).

\* cited by examiner

| UL/DL CONFIGU-RATION | NUMBER OF HARQ PROCESSES | SUBFRAME n | | | | | | | | | |
|---|---|---|---|---|---|---|---|---|---|---|---|
| | | 0 | 1 | 2 | 3 | 4 | 5 | 6 | 7 | 8 | 9 |
| 0 | 7 | 4 | 6 | - | - | - | 4 | 6 | - | - | - |
| 1 | 4 | - | 6 | - | - | 4 | - | 6 | - | - | 4 |
| 2 | 2 | - | - | - | 4 | - | - | - | - | 4 | - |
| 3 | 3 | 4 | - | - | - | - | - | - | - | 4 | 4 |
| 4 | 2 | - | - | - | - | - | - | - | - | 4 | 4 |
| 5 | 1 | - | - | - | - | - | - | - | - | 4 | - |
| 6 | 6 | 7 | 7 | - | - | - | 7 | 7 | - | - | 5 |

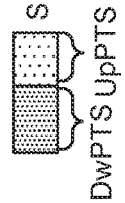
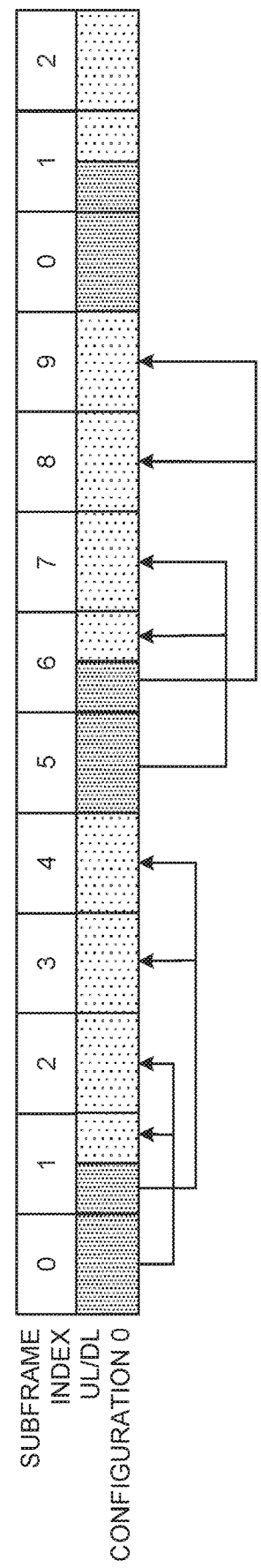
FIG. 4A
FIG. 4B

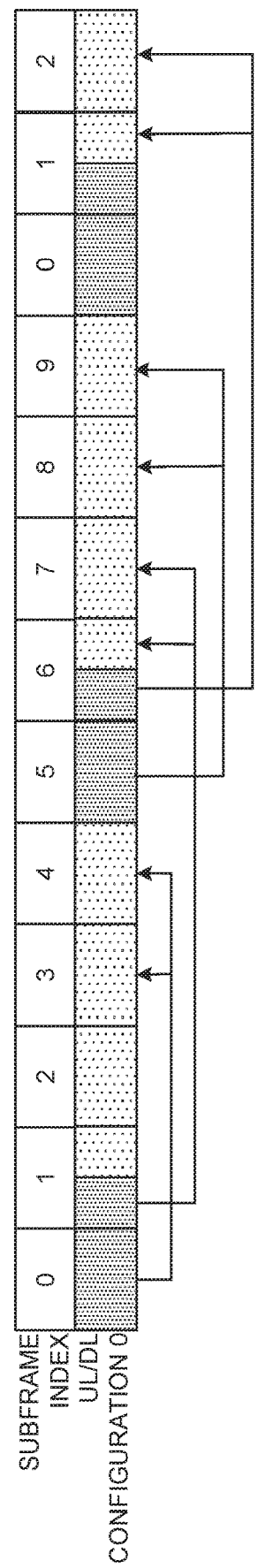

| UL/DL CONFIGURATION | \multicolumn{10}{c}{SUBFRAME n} |
| --- | --- | --- | --- | --- | --- | --- | --- | --- | --- | --- |
| | 0 | 1 | 2 | 3 | 4 | 5 | 6 | 7 | 8 | 9 |
| 0 (UL INDEX MSB=1) | 1 | 2 | | | | 1 | 2 | | | |
| 0 (UL INDEX LSB=1) | 2 | 3 | | | | 2 | 3 | | | |
| 0 (UL INDEX LSB&MSB=1) | 1&2 | 2&3 | | | | 1&2 | 2&3 | | | |
| 6 (UL INDEX MSB=1) | 2 | | | | | 1 | | | | |
| 6 (UL INDEX LSB=1) | 3 | | | | | 2 | | | | |
| 6 (UL INDEX LSB&MSB=1) | 2&3 | | | | | 1&2 | | | | |

FIG. 8

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 (UL INDEX MSB=1) | 2 | 3 | | | | | 3 | | | |
| 0 (UL INDEX LSB=1) | 3 | 5 | | | | 3 | 5 | | | |
| 0 (UL INDEX LSB&MSB=1) | 2&3 | 3&5 | | | | 2&3 | 3&5 | | | |
| 6 (UL INDEX MSB=1) | 3 | | | | | | | | | 2 |
| 6 (UL INDEX LSB=1) | 4 | | | | | | | | | 3 |
| 6 (UL INDEX LSB&MSB=1) | 3&4 | | | | | | | | | 2&3 |

FIG. 9

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 (UL INDEX MSB=1) | 3 | 5 | | | | | | | | |
| 0 (UL INDEX LSB=1) | 4 | 6 | | | | | | | | |
| 0 (UL INDEX LSB&MSB=1) | 3&4 | 5&6 | | | | | | | | |
| 6 (UL INDEX MSB=1) | 4 | | | | | 3&4 | 5&6 | | | 3 |
| 6 (UL INDEX LSB=1) | 6 | | | | | 4 | 6 | | | 4 |
| 6 (UL INDEX LSB&MSB=1) | 4&6 | | | | | 3&4 | 5&6 | | | 3&4 |

FIG. 10

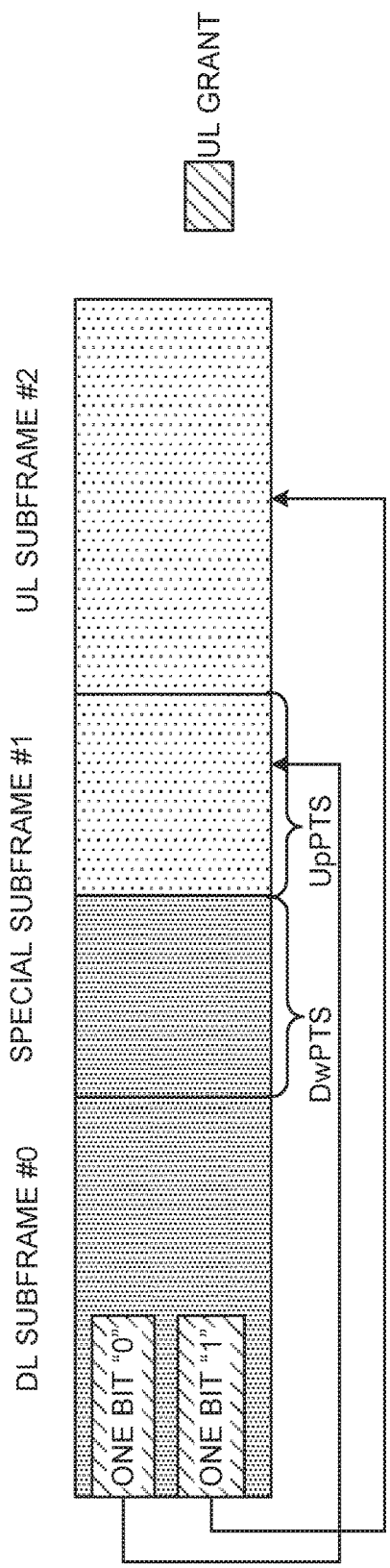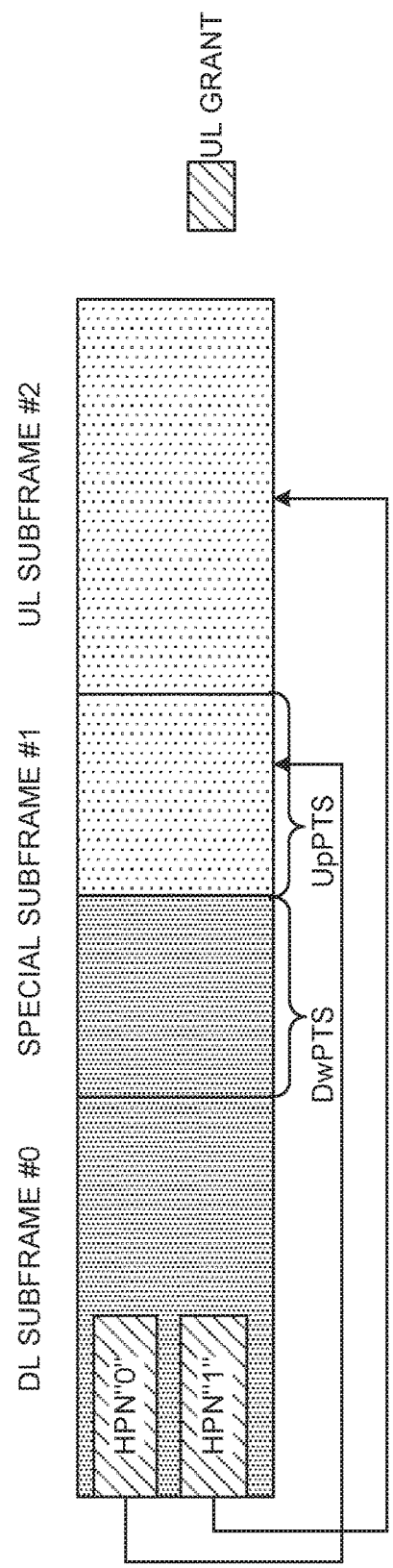

| REFERENCE VALUE | UL/DL CONFIGURATION | | | | | | |
|---|---|---|---|---|---|---|---|
| | 0 | 1 | 2 | 3 | 4 | 5 | 6 |
| 1ms | 4 | 3 | 2 | 3 | 4 | 5 | 6 |
| 2ms | 6 | 3 | 2 | 4 | 3 | 2 | 4 |
| 3ms | 7 | 4 | 3 | 4 | 3 | 2 | 6 |

| REFERENCE VALUE | UL/DL CONFIGURATION | | | | | | |
|---|---|---|---|---|---|---|---|
| 1ms | | 0 | 1 | 2 | 3 | 4 | 5 | 6 |
| | NUMBER OF HPN PROCESSES | 4 | 3 | 2 | 4 | 3 | 2 | 4 |
| | BIT LENGTH OF HPN FIELD | 2 | 2 | 1 | 2 | 2 | 1 | 2 |

FIG. 13B

| REFERENCE VALUE | UL/DL CONFIGURATION | | | | | | |
|---|---|---|---|---|---|---|---|
| 2ms | | 0 | 1 | 2 | 3 | 4 | 5 | 6 |
| | NUMBER OF HPN PROCESSES | 6 | 3 | 2 | 4 | 3 | 2 | 5 |
| | BIT LENGTH OF HPN FIELD | 3 | 2 | 1 | 2 | 2 | 1 | 3 |

FIG. 13C

| REFERENCE VALUE | UL/DL CONFIGURATION | | | | | | |
|---|---|---|---|---|---|---|---|
| 3ms | | 0 | 1 | 2 | 3 | 4 | 5 | 6 |
| | NUMBER OF HPN PROCESSES | 7 | 4 | 3 | 4 | 3 | 2 | 6 |
| | BIT LENGTH OF HPN FIELD | 3 | 2 | 1 | 2 | 2 | 1 | 3 |

| UL/DL CONFIGURATION | \multicolumn{10}{c|}{SUBFRAME n} |
| --- | --- | --- | --- | --- | --- | --- | --- | --- | --- | --- |
| | 0 | 1 | 2 | 3 | 4 | 5 | 6 | 7 | 8 | 9 |
| 0 (UL INDEX MSB=1) | 1 | 2 | | | | 1 | 2 | | | |
| 0 (UL INDEX LSB=1) | 2 | 3 | | | | 2 | 3 | | | |
| 0 (UL INDEX LSB&MSB=1) | 1&2 | 2&3 | | | | 1&2 | 2&3 | | | |
| 6 (UL INDEX MSB=1) | 2 | 2 | | | | 1 | 1 | | | 2 |
| 6 (UL INDEX LSB=1) | 3 | 3 | | | | 2 | 2 | | | 3 |
| 6 (UL INDEX LSB&MSB=1) | 2&3 | 2&3 | | | | 1&2 | 1&2 | | | 2&3 |

FIG. 23

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 (UL INDEX MSB=1) | 2 | 3 | | | | 2 | 3 | | | |
| 0 (UL INDEX LSB=1) | 3 | 5 | | | | 3 | 5 | | | |
| 0 (UL INDEX LSB&MSB=1) | 2&3 | 3&5 | | | | 2&3 | 3&5 | | | |
| 6 (UL INDEX MSB=1) | 3 | 3 | | | | 2 | 2 | | | 2 |
| 6 (UL INDEX LSB=1) | 4 | 5 | | | | 3 | 5 | | | 3 |
| 6 (UL INDEX LSB&MSB=1) | 3&4 | 3&5 | | | | 2&3 | 2&5 | | | 2&3 |

FIG. 24

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 (UL INDEX MSB=1) | 3 | 5 | | | | 3 | 5 | | | |
| 0 (UL INDEX LSB=1) | 4 | 6 | | | | 4 | 6 | | | |
| 0 (UL INDEX LSB&MSB=1) | 3&4 | 5&6 | | | | 3&4 | 5&6 | | | |
| 6 (UL INDEX MSB=1) | 4 | 5 | | | | 3 | 5 | | | 3 |
| 6 (UL INDEX LSB=1) | 6 | 6 | | | | 6 | 6 | | | 4 |
| 6 (UL INDEX LSB&MSB=1) | 4&6 | 5&6 | | | | 3&6 | 5&6 | | | 3&4 |

FIG. 25

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and/or the like).

In existing LTE systems (for example, LTE Rel. 8 to 13), downlink (DL) communication and/or uplink (UL) communication are carried out by using 1-ms transmission time intervals (TTIs) (also referred to as "subframes" and/or the like). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), frequency division duplex (FDD) and time division duplex (TDD) are supported as duplex schemes. FDD is a scheme to assign different frequencies to DL and UL, and is also referred to as "frame structure (FS) type 1 (FS 1)." TDD is a scheme to switch between DL and UL over time in the same frequency, and is also referred to as "frame structure type 2 (FS 2)."

In TDD, communication is carried out based on UL/DL configurations, which define the formats of UL subframes and DL subframes in radio frames. In UL/DL configurations, a special subframe, which is formed with symbols for DL (Downlink Pilot Time Slot (DwPTS)), symbols for switching between DL and UL (Guard Period (GP)), and symbols for UL (Uplink Pilot Time Slot (UpPTS)), is defined. In the UpPTS, it is not allowed to transmit a UL shared channel (for example, a physical uplink shared channel, which hereinafter will be referred to as the "PUSCH").

Furthermore, in existing LTE systems, the timing for PUSCH transmission (also referred to as "PUSCH scheduling timing," "UL scheduling timing," and/or the like), scheduled by downlink control information (also referred to as "DCI," "UL grants," "UL DCI," and so on, and primarily referred to as "UL grants") is determined based on 4 ms. To be more specific, in TDD, the timing for PUSCH transmission (scheduling timing), which is scheduled by UL grants, is determined based on the reference value of 4 ms and UL/DL configurations.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14, 15 and later versions, 5G, NR, and so forth), research is underway to expand UL capacity (uplink capacity enhancement for LTE) beyond existing LTE systems (for example, LTE Rel. 13 and earlier versions). To be more specific, research is underway to allow the PUSCH to be transmitted in the UpPTS in special subframes.

However, in existing LTE systems (for example, LTE Rel. 13 and earlier versions), the timing for transmission of the PUSCH (also regarded as the timing for scheduling the PUSCH, which is transmitted in a predetermined subframe) is determined based on DCI that is received in a predetermined subframe on assumption that the PUSCH is not transmitted in special subframes. Therefore, according to the timing for transmission (scheduling timing) in existing LTE systems, even if a special subframe configuration to allow transmission of the PUSCH is used, there is still a possibility that the PUSCH cannot be transmitted in special subframes.

The present invention has been made in view of the above, and it is therefore an object of the present invention to provide a user terminal and a radio communication method, whereby, when special subframes are allowed to transmit the PUSCH, the transmission of the PUSCH can be controlled adequately.

Solution to Problem

According to one aspect of the present invention, a user terminal has a receiving section that receives downlink control information (DCI) that schedules an uplink (UL) shared channel, and a control section that controls transmission of the UL shared channel by using a table that associates a subframe, in which the DCI is received, and a timing, at which the UL shared channel is transmitted, per UL/downlink (DL) configuration, and the transmission timing in the table is determined based on a special subframe, which is allowed to transmit the UL shared channel, and a predetermined reference value, which is lower than 4 ms.

Advantageous Effects of Invention

According to the present invention, when special subframes are allowed to transmit the PUSCH, the transmission of the PUSCH can be controlled adequately.

BRIEF DESCRIPTION OF DRAWINGS

FIGS. 4A and 4B are diagrams to show examples of PUSCH transmission timings according to a first aspect of the present invention;

FIGS. 6A and 6B are diagrams to show yet other examples of PUSCH transmission timings according to the first aspect;

FIG. 8 is a diagram to show examples of interpretations of UL indices according to the second aspect;

FIG. 9 is a diagram to show other examples of interpretations of UL indices according to the second aspect;

FIG. 10 is a diagram to show yet other examples of interpretations of UL indices according to the second aspect;

FIGS. 11A and 11B are diagrams to show examples of UL grants, provided on a per transmission timing basis, according to the second aspect;

FIG. 12 is a diagram to show examples of the maximum numbers of HARQ processes according to a third aspect of the present invention;

FIGS. 13A to 13C provide diagrams to show examples of the maximum numbers of HARQ processes and the corresponding HPN field bit lengths according to the third aspect;

FIG. 23 is a diagram to show examples of interpretations of UL indices according to another aspect;

FIG. 24 is a diagram to show other examples of interpretations of UL indices according to another aspect; and FIG. 25 is a diagram to show yet other examples of interpretations of UL indices according to another aspect.

DESCRIPTION OF EMBODIMENTS

In the UL of existing LTE systems (for example, LTE Rel. 13 and earlier versions), the timing for transmission of the PUSCH (PUSCH scheduling timing), which is scheduled by UL grants, is determined based on the reference value of 4 ms, on assumption that the processing time (latency) in user terminals is 4 ms.

For example, in FDD, the timing for transmitting the PUSCH is determined to be 4 ms after a subframe in which a UL grant is received. Meanwhile, given that a UL grant is received in a subframe, the timing for transmitting the PUSCH is determined based on the reference value of 4 ms and the UL/DL configuration.

Figure 1:
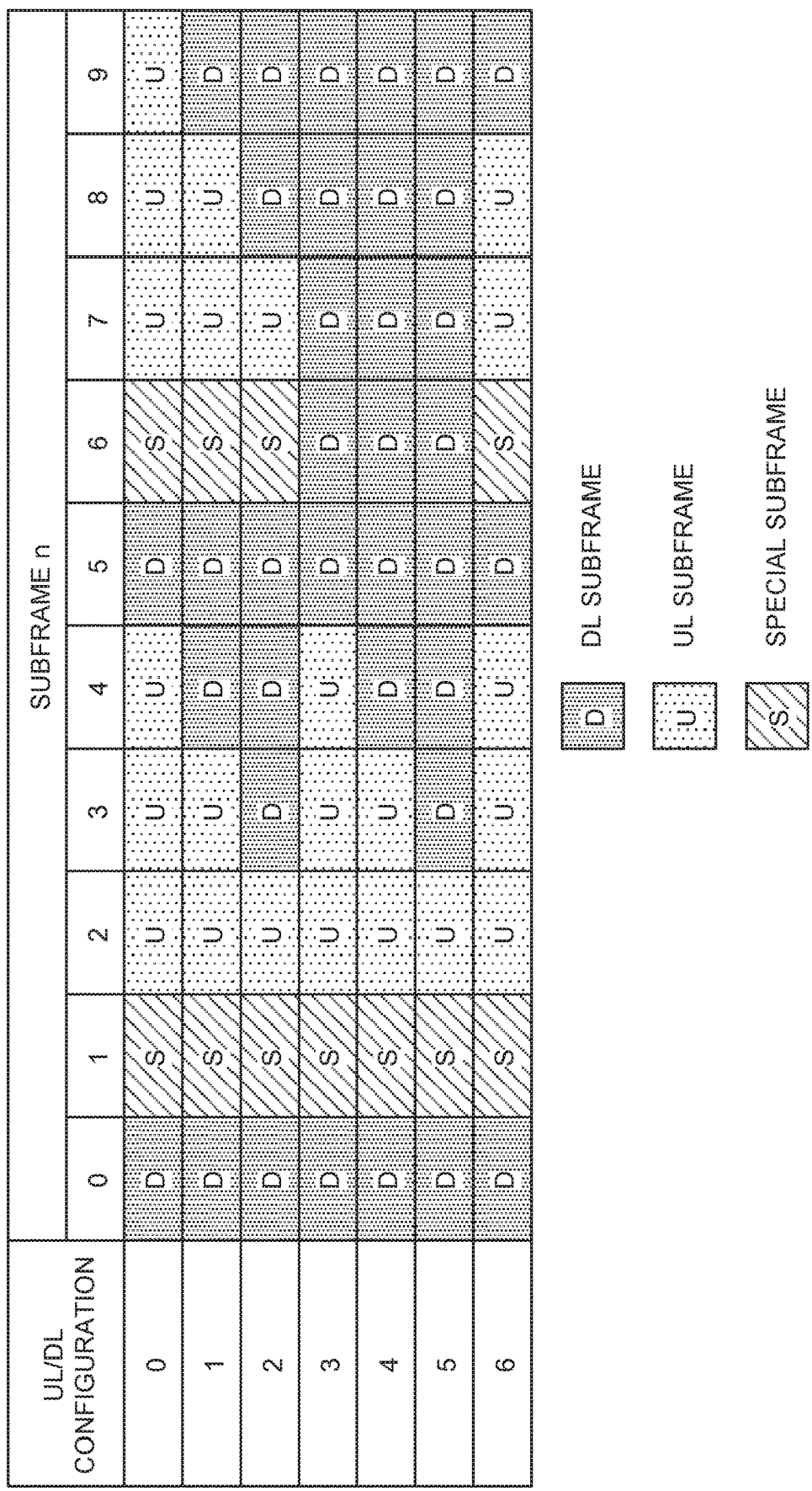
FIG. 1 is a diagram to show examples of UL/DL configurations.

FIG. 1 is a diagram to show examples of UL/DL configurations. As shown in FIG. 1, for TDD in existing LTE systems, seven frame structures—namely, UL/DL configurations 0 to 6—are defined, with varying proportions of UL subframes and DL subframes. Subframes #0 and #5 are allocated to the downlink, and subframe #2 is allocated to the uplink. Also, in UL/DL configurations 0, 1, 2, and 6, the point of change from DL subframes to UL subframes comes in a cycle of 5 ms, and, in UL/DL configurations 3, 4 and 5, the point of change from DL subframes to UL subframes comes in a cycle of 10 ms.

Here, a special subframe is comprised of DL symbols (Downlink Pilot Time Slot (DwPTS)), symbols for switching between DL and UL (Guard Period (GP)), and UL symbols (Uplink Pilot Time Slot (UpPTS)). How many symbols constitute each of the DwPTS, the GP and the UpPTS of a special subframe is determined in special subframe configurations 1 to 9 in existing LTE systems (for example, LTE Rel. 13 and earlier versions).

In special subframe configurations 1 to 9, the number of UpPTS symbols is limited to a maximum of two symbols. Therefore, in the UpPTS of existing LTE systems (for example, LTE Rel. 13 and earlier versions), the sounding reference signal (SRS) and/or the random access channel (PRACH (Physical Random Access CHannel)) are transmitted, but the PUSCH is not transmitted.

Figures 2A, 2B:
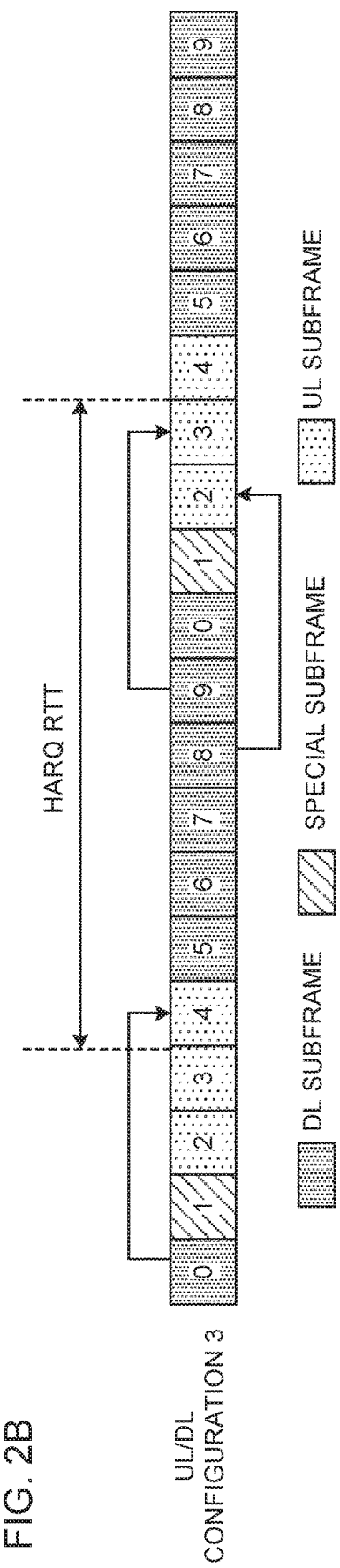
FIGS. 2A and 2B are diagrams to show examples of PUSCH transmission timings in TDD.

FIG. 2 are a diagram to show examples of PUSCH transmission timings in TDD. FIG. 2A shows the relationship between subframes n in which UL grants are received and subframes in which PUSCH transmission is scheduled by these UL grants, on a per UL/DL configuration basis.

To be more specific, FIG. 2A shows the values of k in the event subframe #n (0≤n≤9) schedules the PUSCH in UL subframe #n+k, which is located k subframes later, for each UL/DL configuration schedules. As shown in FIG. 2B, when DCI is received in subframe #n, a user terminal transmits the PUSCH that is scheduled by this DCI in subframe #n+k. In this way, in the table shown in FIG. 2A, DCI-receiving subframes #n and PUSCH-transmitting (scheduling) timings k are associated with each other.

Also, in TDD, the maximum number of HARQ (Hybrid Automatic Repeat reQuest) processes is set to values to suit UL/DL configurations. HARQ processes are data (transport block (TB) or code block (CB)) processing units, and in an HARQ process of a given number (HARQ Process Number (HPN)), the same data continues being transmitted until an ACK is received. Also, in one subframe, one HARQ process is used. By implementing a plurality of HARQ processes individually in parallel, it is possible to transmit the data of the next HARQ process without waiting for an A/N in response to the previous HARQ process, so that the latency time is reduced.

In this way, the time it takes to be able to use the same HPN again (for example, the time from when data is scheduled until retransmission control information in response to this data can be transmitted) is also referred to as the "round trip time (RTT)" (HARQ RTT). In TDD, the HARQ RTT is also set to values to suit UL/DL configurations.

For example, as shown in FIG. 2B, in UL/DL configuration 3, the UL grant of DL subframe #0 schedules the PUSCH of UL subframe #4, and an A/N in response to this PUSCH is transmitted in the PHICH of DL subframe #0, which is located six subframes later. In this case, the same HPN becomes available again ten subframes after UL subframe #4, so that the HARQ RTT is ten subframes.

Thus, in TDD, the HARQ RTT is substantially equal to the sum of the maximum value of k in each UL/DL configuration (4 in UL/DL configuration 3) and the number of subframes it takes until a PHICH is received in response to a PUSCH. Also, the maximum number of HARQ processes is equal to the number of UL subframes in the HARQ RTT, and, for example, in UL/DL configuration 3, the maximum number of HARQ processes is three.

Now, for future radio communication systems (for example, LTE Rel. 14, 15 and later versions, 5G, NR, etc.), research is underway to expand UL capacity (uplink capacity enhancement for LTE) beyond existing LTE systems (for example, LTE Rel. 13).

To be more specific, research is underway to increase the maximum number of UpPTS symbols in the above-mentioned special subframes beyond two symbols, and make it possible to transmit the PUSCH in the UpPTS. For example, there is a plan to introduce a configuration of special subframes (for example, special subframe configuration 10) comprised of a DwPTS of six symbols with normal cyclic prefix (NCP), a GP of two symbols, and an UpPTS of six symbols with NCP or an UpPTS of five symbols with extended cyclic prefix (ECP).

Figure 3:
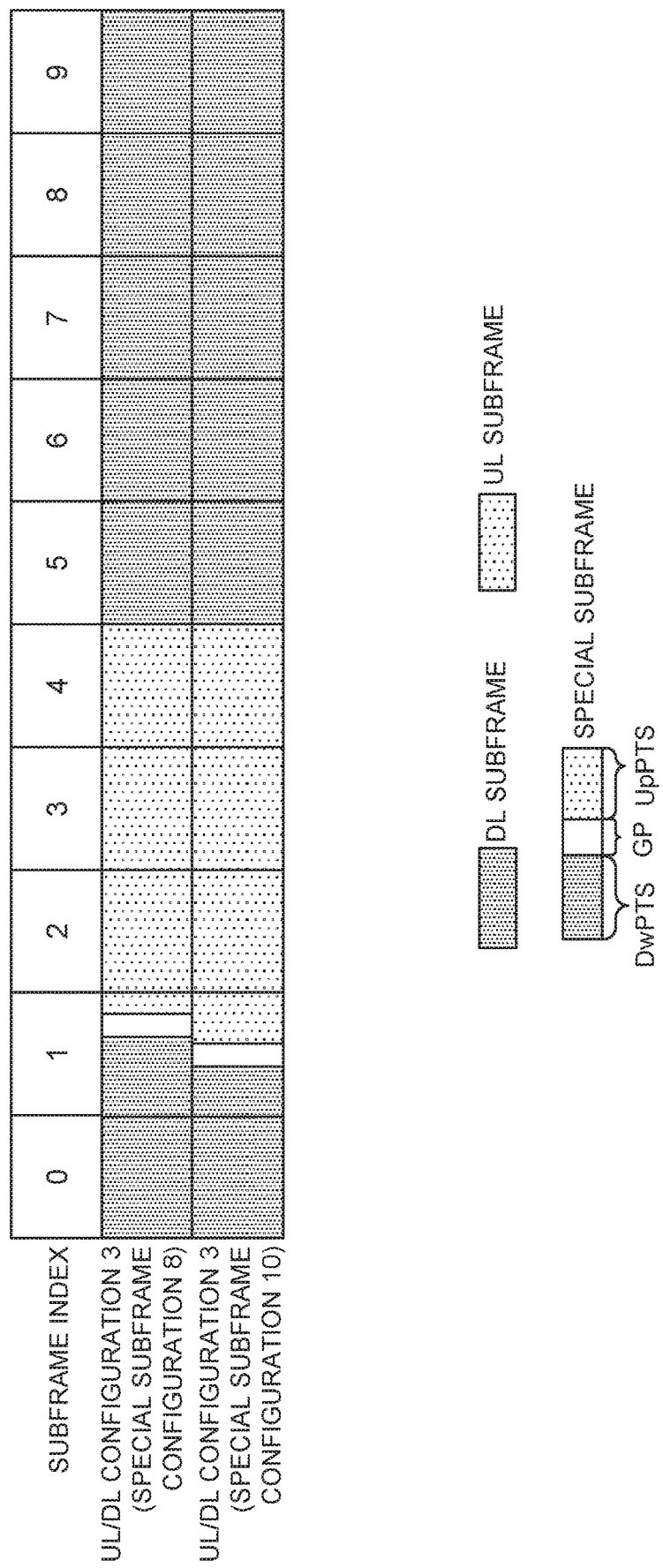
FIG. 3 is a diagram to show an example of applying special subframe configuration 10.

FIG. 3 is a diagram to show an example of applying special subframe configuration 10. FIG. 3 shows an example of applying special subframe configurations 8 and 10 to UL/DL configuration 3. The ratio of the numbers of DwPTS, GP and UpPTS symbols is 10:2:2 in special subframe configuration 8, and 6:2:6 (or 5) in subframe configuration 10, but these are by no means limiting. Also, special subframe configuration 10 can be applied to other UL/DL configurations as well.

Referring to FIG. 3, special subframe #1 of UL/DL configuration 3, which adopts special subframe configuration 8, transmits no PUSCH in the UpPTS. Meanwhile, special subframe #1 of UL/DL configuration 3, which adopts special subframe configuration 10, is allowed to transmit the PUSCH in the UpPTS.

However, in existing LTE systems (for example, LTE Rel. 13 and earlier versions), as shown in FIG. 2A, the timing for PUSCH transmission (scheduling) is determined on assumption that no PUSCH is transmitted in special subframes. For this reason, even if a special subframe configuration to allow PUSCH transmission is used, it is more likely that the PUSCH cannot be transmitted in special subframes based on the transmission (scheduling) timing specified in FIG. 2A. Therefore, it is desirable to determine PUSCH transmission (scheduling) timings that are suitable when special subframes are allowed to transmit the PUSCH.

Also, future radio communication systems are required to reduce latency, including propagation latency and processing latency, in order to provide communication services with strict requirements on latency, such as URLLC. As for the method of reducing latency, it may be possible to shorten the very processing unit for use for controlling communication (for example, scheduling and/or retransmission control) by introducing new a TTI (short TTI) that is shorter than a 1-ms subframe (TTI).

Meanwhile, from the perspective of reusing existing channel structures (for example, PUSCH, PUCCH, etc.), Meanwhile, even when 1-ms subframes are kept as processing units for controlling communication, it is still desirable to reduce latency. In this case, it is conceivable to reduce latency on the UL by shortening the time it takes after a UL grant is received until a PUSCH is transmitted.

However, the table shown in FIG. 2A determines the timing for PUSCH transmission (scheduling) based on the reference value of 4 ms on assumption that the time it takes after a UL grant is received until a PUSCH is transmitted is 4 ms, and therefore there is a possibility that latency cannot be reduced adequately based on these transmission (scheduling) timings.

So, presuming future radio communication systems, the present inventors have come up with the idea of determining the timing for PUSCH transmission (scheduling) based on special subframes that are allowed to transmit the PUSCH, thereby enabling proper control over PUSCH transmission when special subframes are allowed to transmit the PUSCH. In addition, the present inventors have come up with the idea of reducing latency while keeping 1-ms subframe as processing units for communication control by determining the timing for PUSCH transmission (scheduling) based on predetermined reference values that are lower than 4 ms.

Now, embodiments of the present invention will be described below in detail. Cases will be described below, in which UL capacity enhancement and latency reduction are implemented by determining the timing for PUSCH transmission (scheduling) based on special subframes that are allowed to transmit the PUSCH, and based on predetermined reference values that are lower than 4 ms. Note that, by using these special subframes, enhancement of UL capacity can be realized even when the above transmission (scheduling) timing is determined based on the reference value of 4 ms.

Also, the special subframes of the present embodiment are allowed to transmit the PUSCH in the UpPTS. Although each special subframe to contain a DwPTS and a UpPTS will be shown below, the proportions of the DwPTS and the UpPTS are not limited to the following examples. Also, although not shown in the drawings, a GP may be provided between the DwPTS and the UpPTS.

Also, although cases will be described below in which the timing for transmitting a PUSCH is determined based on a UL grant that is received in a predetermined subframe, this transmission timing can also be regarded as the timing for scheduling a PUSCH that is transmitted in a predetermined subframe.

(First Aspect)

Now, with a first aspect of the present invention, the timing for PUSCH transmission will be described below. According to the first aspect, a user terminal controls the transmission of the PUSCH by using a table, in which UL grant (DCI)-receiving subframes (#n) and PUSCH transmission timings (k) are associated with each other, on a per UL/DL configuration basis.

The PUSCH transmission timings in this table are determined based on special subframes that are allowed to transmit the PUSCH and based on predetermined reference values that are lower than 4 ms. By determining these transmission timings based on predetermined reference values lower than 4 ms (for example, 1 ms, 2 ms, 3 ms, and so forth), it is possible to reduce the latency after a UL grant is received until a PUSCH is transmitted based on this UL grant.

Furthermore, the PUSCH transmission timings in this table may be determined based on the overhead caused by UL grants in receiving subframes. For example, these transmission timings may be determined such that UL grants do not concentrate in specific DL subframes or special subframes but are distributed evenly between DL subframes and special subframes in the HARQ RTT. Furthermore, these transmission timings may be determined so that the UL grant-induced overhead in the DwPTS of special subframes is reduced.

Now, the timing for PUSCH transmission according to the first aspect will be described in detail below with reference to FIG. 4 to FIG. 6. FIG. 4A, FIG. 5A and FIG. 6A show tables, in which UL grant (DCI)-receiving subframes (#n) and PUSCH transmission timings (k) are associated with each other on a per UL/DL configuration basis. That is, these tables show the values of k assuming that a UL grant is received in subframe #n and a PUSCH is transmitted in subframe #n+k.

Figure 5A:
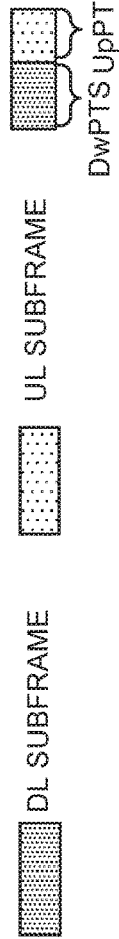
FIGS. 5A and 5B are diagrams to show other examples of PUSCH transmission timings according to the first aspect.
Figure 5B:
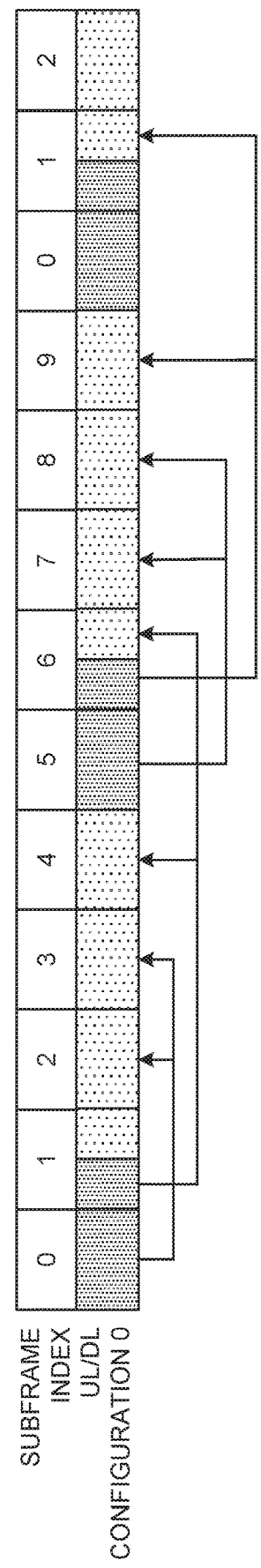

The transmission timings (k) shown in FIG. 4A, FIG. 5A, and FIG. 6A are determined based on reference values that are lower than 4 ms, subframes (UL subframes and/or special subframes) that can transmit the PUSCH according to each UL/DL configuration, and the overhead in receiving subframes (#n).

For example, FIG. 4A shows PUSCH transmission timings, k, which are based on a reference value of 1 ms. To be more specific, according to UL/DL configuration 0 in FIG. 4A, when UL grants are received in DL subframes #0 and #5, the timing "k" to transmit the PUSCH is set to 2 and 1. Also, when UL grants are received in the DwPTSs of special subframes #1 and #6, the timing k to transmit the PUSCH is set to 3 and 2.

According to the table shown in FIG. 4A, the UL grant of subframe #0 schedules PUSCHs in the UpPTSs of UL subframe #2, which is located 2 ms later, and special subframe #1, which is located 1 ms later, as shown in FIG. 4B. Also, the UL grant of subframe #1 schedules PUSCHs in UL subframes #4 and #3, which are located 3 ms and 2 ms later. The UL grants of subframes #5 and #6 also function likewise.

Furthermore, according to the table shown in FIG. 4A, the PUSCHs in the UpPTS of special subframe #1 and UL subframes #2 to #4 are scheduled so as to be distributed over the DwPTSs of DL subframe #0 and special subframe #1. Therefore, it is possible to prevent UL grant-induced overhead from concentrating in a specific subframe #n. Other UL/DL configurations also function likewise.

FIG. 4A shows the value of k when a reference value of 1 ms is used and PUSCH transmission is allowed in special subframes in each UL/DL configuration. For example, referring to UL/DL configuration 0 in FIG. 4A, the value of k is set to 2 and 1 in DL subframes #0 and #5, respectively, and the value of is set to 3 and 2 in the DwPTSs of special subframes #1 and #6, respectively.

Similarly, FIG. 5A shows PUSCH transmission timings, k, that are determined based on a reference value of 2 ms, and FIG. 6A shows PUSCH transmission timings, k, that are determined based on a reference value of 3 ms.

According to the first aspect, a user terminal may switch the table that defines the timing k for PUSCH transmission (for example, switch the tables of FIG. 4A, FIG. 5A or FIG. 6A, and/or a table (not shown) in which the reference value is 4 ms) based on information that is reported from the radio base station and that indicates the reference value (reference value information). The reference value information may be transmitted from the radio base station through higher layer signaling and/or physical layer signaling.

According to the first aspect, tables are provided for use for controlling PUSCH transmission, PUSCH transmission timings k are determined based on special subframes that are allowed to transmit the PUSCH and based on predetermined reference values that are lower than 4 ms. Consequently, it is possible to allow the PUSCH to be transmitted in the UpPTS of special subframes, and control the transmission of the PUSCH adequately even when the processing time is reduced by shortening the processing delay after a UL grant is received until a PUSCH is transmitted.

(Second Aspect)

Now, with a second aspect of the present invention, control of PUSCH transmission in the event multiple PUSCH transmission timings (multiple values of k) are associated with UL grant-receiving subframe #n, in the tables described in the first aspect, will be described below.

Referring to the tables shown in FIG. 4A, FIG. 5A and FIG. 6A, in UL/DL configurations 0 and 6, a number of transmission timings k are associated with receiving subframe #n. For example, when a UL grant is received subframe #0 of UL/DL configuration 0 in FIG. 4A, a PUSCHs are allowed to be transmitted in UL subframes #2 and #1, which are located 2 and 1 ms later.

When PUSCHs for multiple subframes can be scheduled by single subframe #n like this, the problem lies in how to design UL grants. Therefore, there is a demand for a UL grant format that is suitable for the case in which, in the above tables, a number of PUSCH transmission timings k' are associated with receiving subframe #n. Also, the user terminal needs to recognize which subframe's PUSCH is scheduled by the UL grant transmitted in this single subframe #n.

According to the second aspect, when a number of PUSCH transmission timings k are associated with receiving subframe #n in the above tables, a UL grant that applies in common to these multiple transmission timings may be provided (first method), or UL grants may be provided on a per transmission timing basis (second method).

Also, in the second aspect, a user terminal may determine at least one of these transmission timings k based on at least one of identification information in a UL grant, the HARQ process number in this UL grant, a prospective resource (candidate resource) in which this UL grant is detected (the index of a potential DL control channel), and the aggregation level.

<First Method>

According to the first method, when a number of transmission timings k' are associated with receiving subframe #n in the above tables, the transmission of PUSCH is controlled using a UL grant that applies in common to these transmission timings k'.

Figure 21:
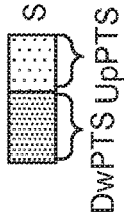
FIG. 21 is a diagram to show other examples of PUSCH transmission timings according to another aspect.

FIG. 7 are diagrams to show examples of UL grants that each apply in common to a number of transmission timings, according to the second aspect. FIGS. 21 A to 21 C show cases where a single UL grant received in DL subframe #0 schedules the UpPTS of special subframe #1 and/or the PUSCH of UL subframe #2, in accordance with the values of k, namely 2 and 1, in subframe #0 of UL/DL configuration 0 shown in FIG. 4A.

Figure 7A:
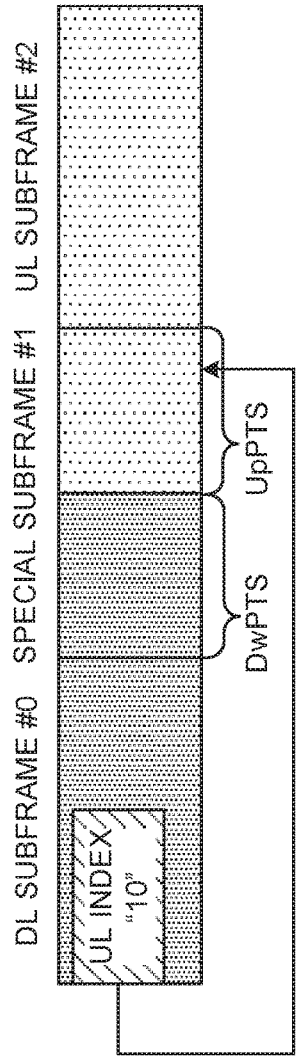
FIGS. 7A to 7C are diagrams to show examples of UL grants that apply in common to a number of transmission timings, according to a second aspect of the present invention.
Figure 7B:
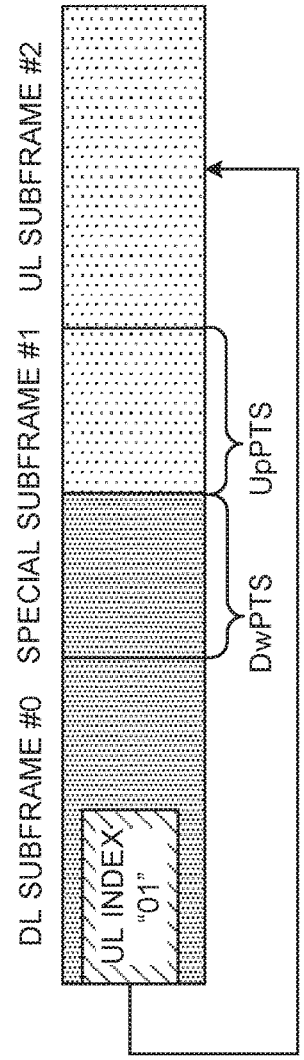
Figure 7C:
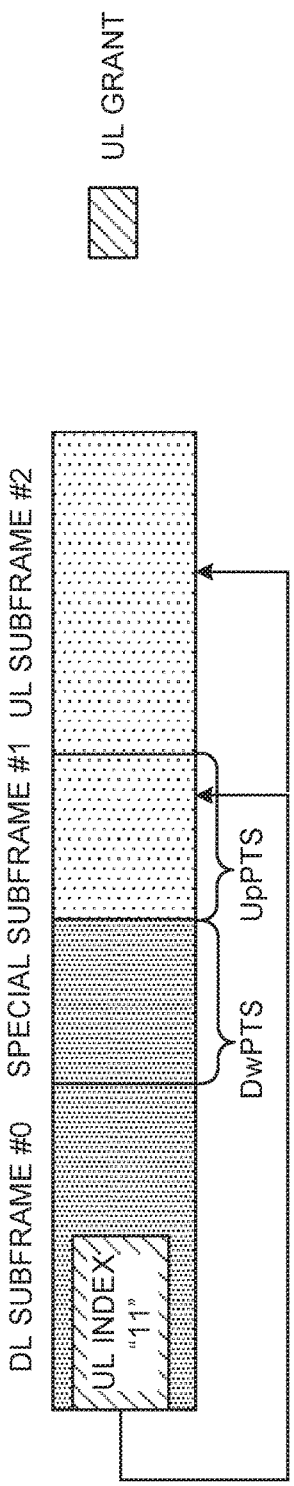

The UL grants shown in FIGS. 7A to 7C each include identification information (UL index) that specifies which subframe's PUSCH the scheduling information that is contained relates to. To be more specific, in the tables shown in FIG. 4A, FIG. 5A, and FIG. 6A, in which a number of transmission timings k are associated with receiving subframe #n, a UL index indicates at least one of these transmission timings k.

For example, as shown in FIG. 7A, when the UL grant of DL subframe #0 schedules the PUSCH in the UpPTS of special subframe #1, this UL grant may include a UL index of "10," which indicates that the transmission timing k in DL subframe #0 in FIG. 4A is "1." That is, of the two bits that represent the UL index, the most significant bit (also referred to as the "MSB," the "leftmost bit" and/or the like) may be configured to "1" (see UL/DL configuration 0 in subframe #0 of FIG. 8 (MSB of UL index=1)).

Also, as shown in FIG. 7B, when the UL grant of DL subframe #0 schedules the PUSCH of UL subframe #2, this UL grant may include a UL index of "01," which indicates that the transmission timing k in DL subframe #0 in FIG. 4A is "2." That is, of the two bits that represent the UL index, the least significant bit (also referred to as the "LSB," the "leftmost bit," and/or the like) may be configured to "1" (see UL/DL configuration 0 in subframe #0 of FIG. 8 (LSB of UL index=1)).

Also, as shown in FIG. 7C, when the UL grant of DL subframe #0 schedules PUSCHs in both the UpPTS of special subframe #1 and UL subframe #2, this UL grant may include the UL index "11," which indicates that the transmission timing k in DL subframe #0 of FIG. 4A is "1" and "2." That is, of the two bits that represent the UL index, the MSB and the LSB may be configured to "1" (see UL/DL configuration 0 in subframe #0 of FIG. 8 (LSB&MSB of UL index=1)).

Here, the UL index may be placed by reusing the DAI (Downlink Assignment Indicator (Index)) field in the UL grant (for example, in UL/DL configuration 0), or may be placed in a new information field (for example, in UL/DL configuration 6). When a new information field is provided, a UL grant that is placed in this information field may be transmitted and received in terminal-specific search spaces (UE-specific search spaces), and a UL grant that is transmitted/received in the common search space may not have this information field. In this case, even if a configuration in which special subframes might schedule PUSCH transmission is applied to the user terminal via higher layer signaling and so on, the user terminal does not need to increase the number of times to perform blind decoding on the common search space, so that the power consumption of the terminal can be reduced.

Furthermore, although FIGS. 7A to 7C show examples in which a UL grant that schedules a PUSCH in special subframe #1 or in UL subframe #2 is transmitted and received in DL subframe #0, this is by no means limiting. This UL grant may be transmitted and received in other subframes (for example, subframes #9, #8, #7, #6 and/or others).

In addition, although FIGS. 7A to 7C have shown cases of communicating by using one TDD carrier, the present invention may be enhanced and applied to uplink carrier aggregation (UL-CA) in which a number of uplink carriers are bundled and used.

In UL-CA, when uplink scheduling is performed per component carrier (CC) (that is, when cross-carrier scheduling is not performed or when CIF is not configured), scheduling is controlled using CC-specific UL grants, based on the above-described UL indices.

When UL-CA is used and uplink scheduling is performed across CCs (that is, when cross-carrier scheduling is performed or when CIF is configured), a UL index may be included in a UL grant depending on whether or not PUSCH transmission is configured in the UpPTS of the CC where the UL grant is transmitted (scheduling CC). In this case, if PUSCH transmission is configured in the UpPTS in the UL grant-transmitting CC (scheduling CC), a UL index field is provided in the UL grant even when PUSCH transmission is not configured in the UpPTS of the CC where PUSCH transmission is scheduled (scheduled CC). In this case, when the user terminal performs blind decoding on the UL grant in the scheduling CC, the user terminal does not have to keep in mind that UL grants are formed with different number of bits in every CC, so that it is not necessary to increase the number of times to perform blind decoding, and the power consumption can be reduced.

As described above, when the timing for PUSCH scheduling is determined using the table of FIG. 4A, at least one of a plurality of transmission timings k that are associated with subframe #n may be specified based on the configuration values of UL indices shown in the table of FIG. 8. Similarly, in the event the timing for PUSCH scheduling is determined using the tables of FIG. 5A and FIG. 6A, at least one of a plurality of transmission timings k that are associated with subframe #n may be specified based on the configuration values of UL indices shown in the tables of FIG. 9 and FIG. 10, respectively.

According to the first method, one or more subframes' PUSCHs can be scheduled with a single UL grant, so that the overhead due to UL grants and the processing load due to blind decoding in user terminals can be reduced.

<Second Method>

According to the second method, when a number of transmission timings k' are associated with receiving subframe #n in the above tables, the transmission of PUSCH is controlled by applying separate UL grants to these transmission timings k'. That is, according to the second method, when PUSCHs are transmitted in a number of transmission timings (subframes), UL grants are provided on a per transmission timing basis.

FIG. 11 are diagrams to show examples of UL grants provided on a per transmission timing basis, according to the second aspect. FIGS. 11A and 11B show examples, in which, in accordance with the values of k, namely 2 and 1, in subframe #0 of DL/UL configuration 0 in FIG. 4A, two UL grants that are received in DL subframe #0 schedule PUSCHs in the UpPTS of special subframe #1 and in UL subframe #2.

As shown in FIG. 11A, UL grants that are provided on a per transmission timing basis may each contain identification information that identifies which transmission timing's (which subframe's) PUSCH is scheduled. For example, in FIG. 11A, the smaller the index of the subframe that is scheduled, the smaller the bit value of the identification information in the UL grant is configured.

Referring to FIG. 11A, when a number of transmission timings k are associated with receiving subframe #n in the above tables, the identification information in the UL grants can specify the timing for transmission explicitly. Note that, in this identification information, existing information fields may be reused, or new information fields may be added.

Meanwhile, which transmission timing's (which subframe's) PUSCH is scheduled may be indicated in an implicit manner. In FIG. 11B, the HPN in each UL grant implicitly specifies the timing for transmitting PUSCH (transmitting subframe). For example, in FIG. 11B, it is determined in advance that the UL grant of the smaller HPN schedules the PUSCH of the smaller subframe index. The user terminal may recognize the timing to transmit the PUSCH based on the HPN field value in the UL grant.

Alternatively, the timing for transmitting the PUSCH (transmitting subframe) may be specified implicitly based on the prospective resource of the DL control channel where the UL grant is placed. For example, it may be determined in advance that a UL grant placed in an odd-numbered prospective resource in the search space schedules the PUSCH with the smaller subframe index, and a UL grant placed in an even-numbered prospective resource schedules the PUSCH with the larger subframe index. The user terminal may recognize the timing to transmit the PUSCH based on the prospective resource in which the UL grant is detected.

Alternatively, the timing for transmitting the PUSCH (transmitting subframe) may be specified implicitly based on the aggregation level (AL) of resource units (for example, CCEs (Control Channel Elements)) at which the UL grant is transmitted. For example, it may be determined in advance that a UL grant detected in a CCE of AL=1 or 4 schedules the PUSCH of the smaller subframe index, and a UL grant detected in a CCE of AL=2 or 8 schedules the PUSCH of the larger subframe index. The user terminal may recognize the timing to transmit the PUSCH based on the AL in which the UL grant is detected.

Alternatively, the timing for transmitting the PUSCH (transmitting subframe) may be designated implicitly based on parameters that are used to scramble (mask) the CRC appended to the UL grant. The user terminal may recognize the timing to transmit the PUSCH based on parameters used for CRC check of the UL grant.

FIGS. 11A and 11B show examples in which a UL grant to schedule the PUSCH in special subframe #1 or UL subframe #2 is transmitted and received in DL subframe #0, but this is by no means limiting. This UL grant may be transmitted and received in other subframes (for example, subframes #9, #8, #7, #6 and/or others).

In addition, although FIGS. 11A and 11B have shown cases of communicating using one TDD carrier, the present invention may be enhanced and applied to uplink carrier aggregation (UL-CA) in which a number of uplink carriers are bundled and used. In UL-CA, when uplink scheduling is performed per component carrier (CC) (that is, when cross-carrier scheduling is not performed or when no CIF is configured), the UL grant-based scheduling control that has been described earlier with the second method is implemented by using CC-specific UL grants.

When UL-CA is used and uplink scheduling is performed across CCs (that is, when cross-carrier scheduling is performed or when CIF is configured), the UL grant-based scheduling control that has been described earlier with the second method may be implemented depending on whether or not PUSCH transmission is configured in the UpPTS of the CC where the UL grant is transmitted (scheduling CC). In this case, if PUSCH transmission is configured in the UpPTS in the UL grant-transmitting CC (scheduling CC), the UL grant-based scheduling control that has been described earlier with the second method is implemented even when PUSCH transmission is not configured in the UpPTS of the CC where PUSCH transmission is scheduled (scheduled CC). In this case, when the user terminal performs blind decoding on the UL grant in the scheduling CC, the user terminal does not have to keep in mind that UL grants are formed with different number of bits in every CC, so that it is not necessary to increase the number of times to perform blind decoding, and the power consumption can be reduced.

Alternatively, when cross-carrier scheduling and the second method are used, the demodulation of UL grants may be controlled differently depending on whether or not PUSCH transmission is configured in the UpPTS in CCs where PUSCH transmission is scheduled (scheduled CCs). In this case, the user terminal only needs to optimize the control for the demodulation of UL grants only in CCs where PUSCH transmission is actually configured in the UpPTS, so that it is possible to prevent the processing load from increasing, and reduce the power consumption.

According to the second method, the UL grant provided at each transmission timing can schedule PUSCHs in one or more subframes, so that existing DCI formats can be reused.

As described above, according to the second aspect, even when a number of PUSCH transmission timings (multiple values of k) are associated with UL grant-receiving subframe #n in the tables described in the first aspect, it is still possible to control the transmission of PUSCH properly.

(Third Aspect)

In the third aspect, the maximum number of HARQ processes when the tables described in the first aspect are used, and the number of HPN field bits will be described below.

According to the third aspect, the maximum number of HARQ processes that are used to control retransmission of the PUSCH may be determined based on special subframes that are allowed to transmit the PUSCH, and based on predetermined reference values that are lower than 4 ms.

FIG. 12 is a diagram to show examples of the maximum numbers of HARQ processes according to the third aspect. FIG. 12 shows the maximum number of HARQ processes, per UL/DL configuration, assuming that the reference value applied is 1 ms, 2 ms and 3 ms. The maximum number of HARQ processes in each UL/DL configuration is equal to the number of UL subframes in the HARQ RTT, which is determined based on FIG. 4A, FIG. 5A and FIG. 6A. Therefore, the maximum numbers of HARQ processes shown in FIG. 12 may also change depending on reference values (here, 1 ms, 2 ms and 3 ms) and whether or not the PUSCH is allowed to be transmitted in special subframes.

Also, the bit length of the information field (HPN field) that specifies the HARQ process number (HPN) may be a fixed value that does not vary with the maximum number of HARQ processes, or may be an unfixed value that varies with the maximum number of HARQ processes.

For example, in the event the maximum numbers of HARQ processes shown in FIG. 12 are used and the number of HPN field bits is a fixed value that does not vary with the maximum number of HARQ processes, a two-bit HPN field may be used if the reference value is 1 ms. Also, if the reference value is 2 ms or 3 ms, a three-bit HPN field may be used.

When the number of HPN field bits is a fixed value, the bit length of UL grants can be fixed regardless of changes and/or control of UL/DL configurations, so that blind detection can be continued without introducing ambiguities in the bit length of UL grants even during control for changing the UL/DL configuration.

Meanwhile, in the event the maximum numbers of HARQ processes shown in FIG. 12 are used and the number of HPN field bits is an unfixed value that varies with the maximum number of HARQ processes, the number of HPN field bits may be determined as shown in FIG. 13.

FIGS. 13A, 13B and 13C each show the bit length of the HPN field, per UL/DL configuration, when the reference value applied is 1 ms, 2 ms and 3 ms, respectively. As shown in FIGS. 13A to 13C, the overhead of UL grants can be reduced when the length of the HPN field is changed based on the maximum number of HPN processes.

(Other Aspects)

According to the present embodiment, retransmission of the PUSCH may be controlled based on a synchronous scheme, in which HARQ processes and subframes (TTIs) are associated with each other in advance, or may be controlled based on an asynchronous scheme, in which HARQ processes and subframes (TTIs) are not associated with each other in advance. The third aspect is suitable for retransmission control based on an asynchronous scheme.

In retransmission control based on an asynchronous scheme, UL grant may include at least one of information that identifies initially-transmitted data (for example, an NDI), an HPN field that indicates the HARQ process number (HPN), and a field that indicates the redundancy version (RV). In retransmission control based on an asynchronous scheme, a user terminal can control retransmission based on NDIs and HPNs in UL grants, without receiving A/Ns in the PHICH.

Also, according to this embodiment, even when configurations other than UL/DL configurations 0 to 6 are used, the values in the tables of FIG. 4A, FIG. 5A and FIG. 6A can be appropriately changed and used. Also, transmission timings that are determined based on the above reference values and special subframes in which the PUSCH is allowed to be transmitted can also be used as timings to report aperiodic channel state information (CSI).

In addition, in the tables that have been described in the first aspect (for example, FIG. 4A, FIG. 5A and FIG. 6A), PUSCH transmission (scheduling) timings (k) that are associated with UL grant-receiving subframe #n (#0 to #9) are configured not to designate overlapping UL subframes or special subframes, but this is by no means limiting.

Figure 20:
FIG. 20 is a diagram to show examples of PUSCH transmission timings according to another aspect of the present invention.
Figure 22:
FIG. 22 is a diagram to show examples of PUSCH transmission timings according to another aspect.

For example, as shown in the tables of FIG. 20, FIG. 21 and FIG. 22, PUSCH transmission timings k that are associated with subframe #n, in which a UL grant is received, may indicate overlapping UL subframes or special subframes. In this case, the tables (for example, FIG. 8, FIG. 9 and FIG. 10) described in the second aspect may also be changed appropriately as shown in FIG. 23, FIG. 24 and FIG. 25. Note that the tables of FIG. 20 and FIG. 23, the tables of FIG. 21 and FIG. 24 and the tables of FIG. 22 and FIG. 25 are defined based on the reference values of 1 ms, 2 ms, and 3 ms, respectively. Note that, these tables are simply examples, and the values configured in these tables are by no means limiting.

Even when PUSCH transmission timings k in UL grant-receiving subframes #n designate overlapping UL subframes or special subframes, in which subframes these PUSCHs are transmitted may be specified explicitly or implicitly, as described above with the second aspect, so that it is possible to prevent UL grants received in a number of different subframes from scheduling the PUSCH of the same subframe.

For example, in the table shown in FIG. 20, the value "3" of k in DL subframe #0 and the value "2" of k in special subframe #1 of UL/DL configuration 6 specify subframe #3 alike, as the timing for transmitting the PUSCH. In this case, for example, the radio base station may use the UL indices described earlier with the first method of the second aspect (see, for example, FIG. 23) and specify different subframes between the UL grant of DL subframe #0 and the UL grant of special subframe #1, thereby preventing the UL grants, which have been received in different subframes, from scheduling the PUSCH of the same subframe.

For example, referring to UL/DL configuration 6 of FIG. 20, when the UL index of the UL grant of DL subframe #0 indicates that the value of k is "2" and the UL index of the UL grant of special subframe #1 indicates that the value of k is "3," it is possible to prevent the UL grants of DL subframe #0 and special subframe #1 from scheduling the PUSCH of UL subframe #3 alike. Note that the method of specifying the scheduling subframe is not limited to the first method of the second aspect, and the second method of the second aspect and/or other methods can be used as well.

In this way, when the timing k for PUSCH transmission is allowed to indicate overlapping UL subframes or special subframes between subframes #n where UL grants are received, it is possible to improve the flexibility of scheduling in the radio base station.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 14:
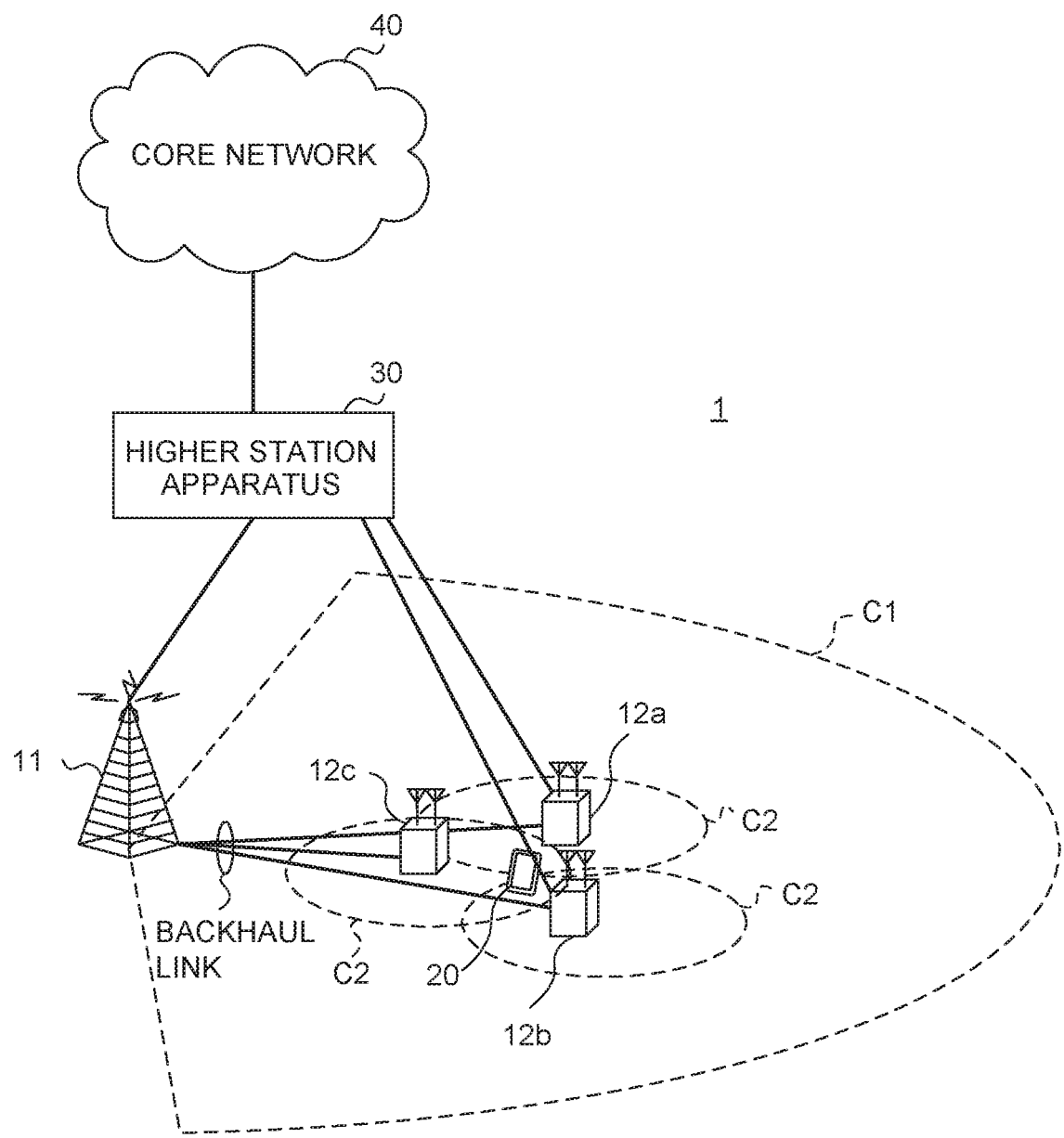
FIG. 14 is a diagram to show an exemplary schematic structure of a radio communication system according to the present embodiment.

FIG. 14 is a diagram to show an exemplary schematic structure of a radio communication system according to the present embodiment. A radio communication system 1 can adopt carrier aggregation (CA), which groups a number of fundamental frequency blocks (component carriers (CCs)) into one, using LTE system bandwidth (for example, 20 MHz) as one unit, and/or dual connectivity (DC), which uses a plurality of cell groups (CGs) that each accommodate one or more CCs. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 14 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed. As used herein, "numerology" refers to frequency-domain and time-domain parameters, such as subcarrier spacing, symbol duration, cyclic prefix duration, subframe duration and so on.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

DL channels that are used in the radio communication system 1 include a DL shared channel that is shared by each user terminal 20 (also referred to as "PDSCH (Physical Downlink Shared CHannel)," "DL data channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. Retransmission control information (for example, at least one of A/N, NDI, HPN, and redundancy version (RV)) pertaining to UL signals (for example, PUSCH) can be communicated using at least one of the PHICH, the PDCCH, and the EPDCCH.

UL channels that are used in the radio communication system 1 include a UL shared channel that is shared by each user terminal 20 (also referred to as "PUSCH (Physical Uplink Shared CHannel)," "UL data channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N) for DL signals (for example, PDSCH), channels state information (CSI), and a scheduling request (SR) is communicated in the PUSCH or the PUCCH. By means of the PRACH, random access preambles for establishing connections with cells are communicated.

(Radio Base Station)

Figure 15:
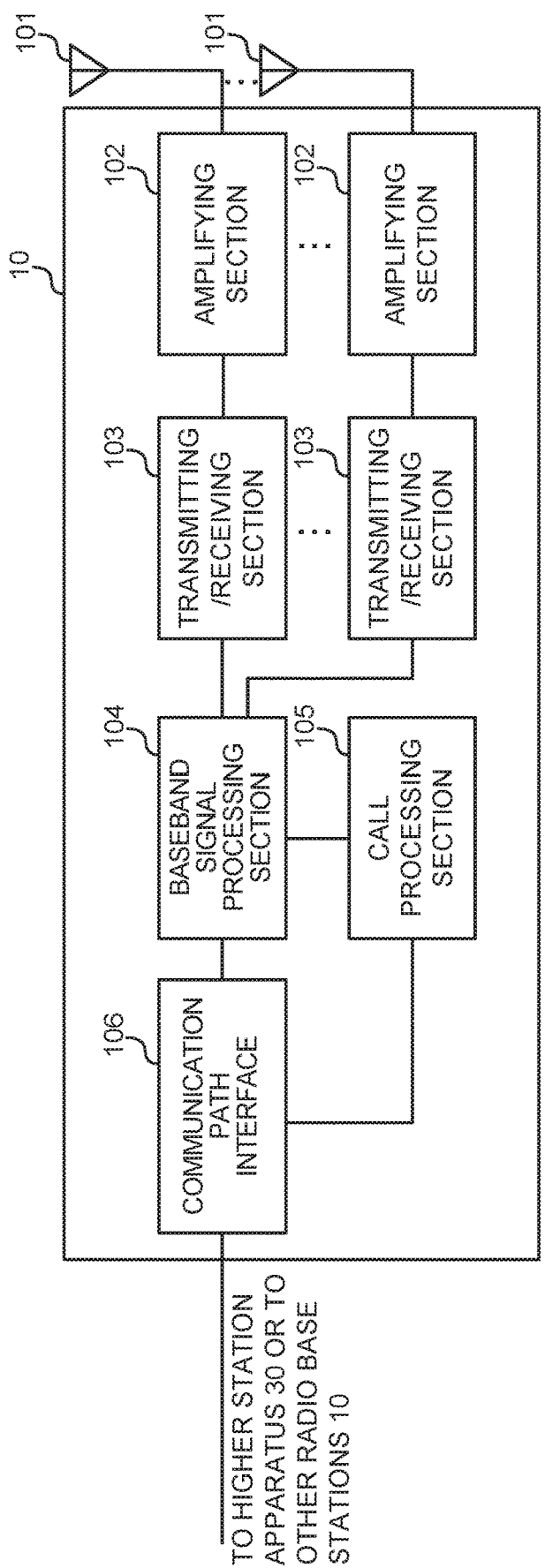
FIG. 15 is a diagram to show an exemplary overall structure of a radio base station according to the present embodiment.

FIG. 15 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

In addition, the transmitting/receiving sections 103 transmit a UL grant (DCI) that schedules a UL shared channel (for example, the PUSCH). In addition, the transmitting/receiving sections 103 receive the UL shared channel. In addition, the transmitting/receiving sections 103 transmit retransmission control information in response to the UL shared channel. This retransmission control information may be included in the above UL grant or transmitted in the PHICH.

In addition, the transmitting/receiving sections 103 may transmit information that represents the reference value for the timing for transmission in the radio base station 10 and/or user terminals 20 and/or the retransmission control scheme.

Figure 16:
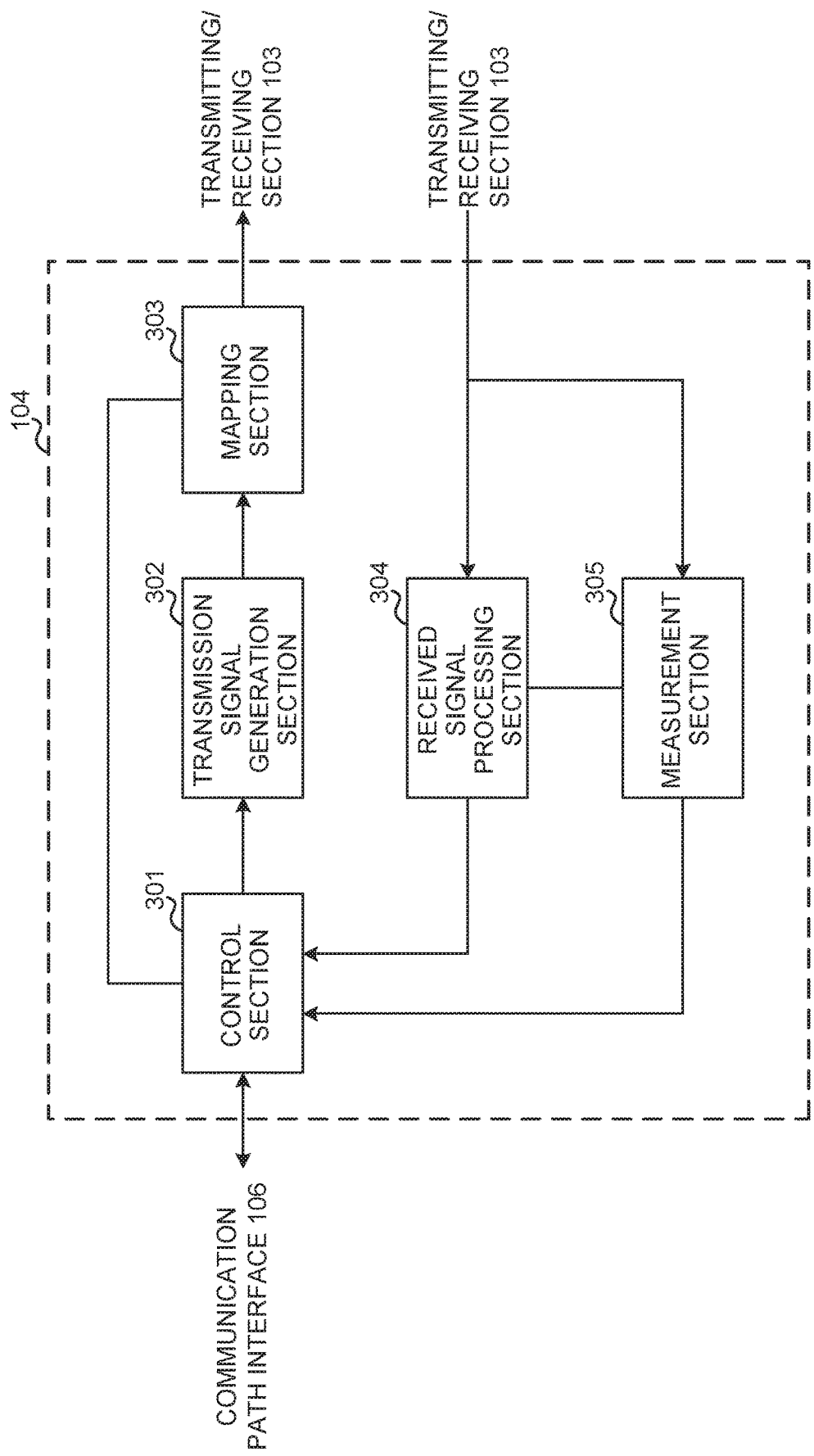
FIG. 16 is a diagram to show an exemplary functional structure of a radio base station according to the present embodiment.

FIG. 16 is a diagram to show an exemplary functional structure of a radio base station according to the present embodiment. Note that, although FIG. 16 primarily shows functional blocks that pertain to characteristic parts of the present embodiment, the radio base station 10 has other functional blocks that are necessary for radio communication as well. As shown in FIG. 16, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 performs scheduling for user terminals 20. For example, the control section 301 schedules the PUSCH and/or the PDSCH for the user terminals 20.

Also, the control section 301 may control the structure of special subframes for the radio base station 10 and/or the user terminals 20, and, when using special subframes in which the PUSCH is allowed to be transmitted (for example, special subframe configuration 10), control the timing for scheduling (transmitting) the PUSCH based on these special subframes (the first aspect).

Also, the control section 301 may control the reference value in the radio base station 10 and/or the user terminals 20, and control the timing for scheduling this PUSCH based on this reference value (first aspect).

Furthermore, the control section 301 may control the scheduling of the PUSCH by using a table that associates UL grant-receiving subframes #n and PUSCH-transmission timings k, per UL/DL configuration (for example, at least one of the tables shown in FIG. 2A, FIG. 4A, FIG. 5A, FIG. 6A, FIG. 20, FIG. 21 and FIG. 22) (the first aspect). The scheduling timings in this table may be determined based on special subframes that are allowed to transmit the PUSCH, and based on predetermined reference values that are lower than 4 ms. The control section 301 may switch the table to look up, when the reference value changes.

In addition, when a plurality of transmission timings k are associated with a receiving subframe #n in the above table, the control section 301 may schedule the PUSCH by using a UL grant that applies in common to these transmission timings k or by using the UL grant of each transmission timing (the second aspect).

Also, the control section 301 may specify at least one of these transmission timings k based on at least one of identification information in a UL grant, the HARQ process number in this UL grant, a prospective resource in which this UL grant is detected (the index of a potential DL control channel), and the aggregation level.

In addition, the control section 301 may control the maximum number of HARQ processes based on special subframes that are allowed to transmit the PUSCH, and based on predetermined reference values that are lower than 4 ms (the third aspect). Note that a UL grant that allocates a PUSCH may include an HPN field that indicates an HPN, and the bit length of the HPN field may be an unfixed value that varies with the maximum number of HARQ processes, or may be a fixed value that does not vary with the maximum number of processes.

Also, the control section 301 may control the retransmission of PUSCH. To be more specific, the control 301 may exert control so that retransmission control information in response to PUSCH is transmitted based on a synchronous scheme or an asynchronous scheme. These PUSCH retransmission control schemes may be associated with the above reference values.

Furthermore, the control section 301 may also control aperiodic CSI reporting. To be more specific, the control section 301 exerts control so that the CSI request field value to include in a UL grant is determined, and this UL grant to contain a CSI request field value is generated and transmitted.

The control section 301 can be constituted by a controller, a control circuit or control apparatus that can be described based on general understanding of the technical field to which the present invention pertains.

The transmission signal generation section 302 generates DL signals (including DL data, DCI (UL grant), and so forth) based on commands from the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

Based on commands from the control section 301, the mapping section 303 maps the DL signals generated in the transmission signal generation section 302 (for example, DL data, DCI, UL data retransmission control information and so on) to predetermined radio resources, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and/or other processes) on UL signals (for example, UL data, UCI and so forth) transmitted from the user terminals 20. To be more specific, the received signal processing section 304 performs receiving processes on UL signals based on the numerology configured in the user terminals 20. To be more specific, the received signal processing section 304 may output the received signals and/or the signals after receiving processes to the measurement section 305. In addition, the received signal processing section 304 performs receiving processes on A/Ns in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure UL channel quality based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 17:
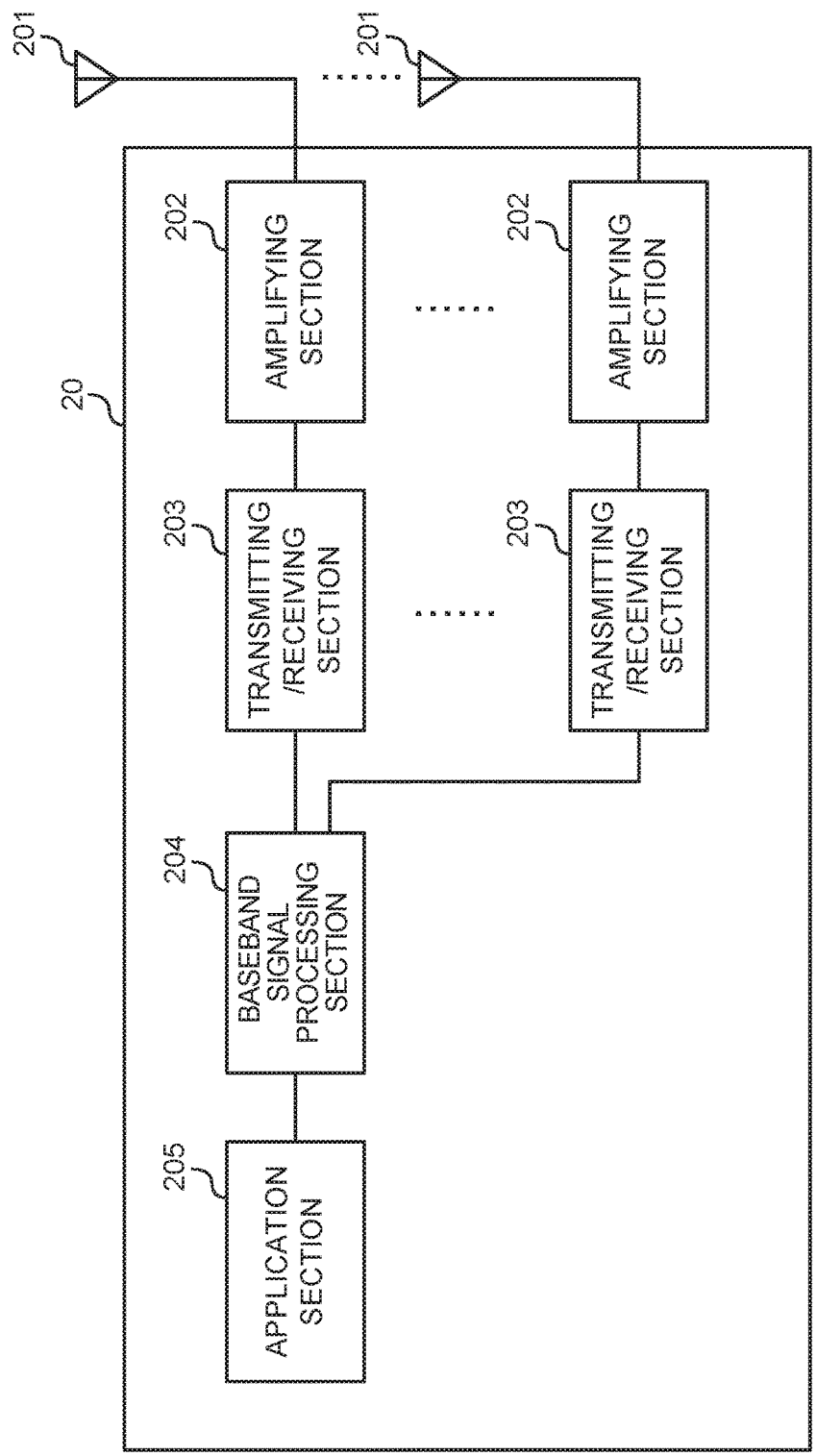
FIG. 17 is a diagram to show an exemplary overall structure of a user terminal according to the present embodiment.

FIG. 17 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer. Also, the broadcast information is also forwarded to application section 205.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (for example, at least one of DL retransmission control information, CSI and an SR) is also subjected to channel coding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 transmit UCI to the radio base station 10 by using a UL shared channel (for example, PUSCH) or a UL control channel (for example, PUCCH).

Also, the transmitting/receiving sections 203 receive a UL grant (DCI) that schedules the UL shared channel (for example, PUSCH). In addition, the transmitting/receiving sections 203 transmit the UL shared channel following commands from the control section 401. Furthermore, the transmitting/receiving sections 203 receive retransmission control information for the UL shared channel. This retransmission control information may be included in the above UL grant or transmitted in the PHICH.

Also, the transmitting/receiving sections 203 may receive information that represents the reference value for the timing for transmission in the radio base station 10 and/or user terminals 20 and/or the retransmission control scheme.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 18:
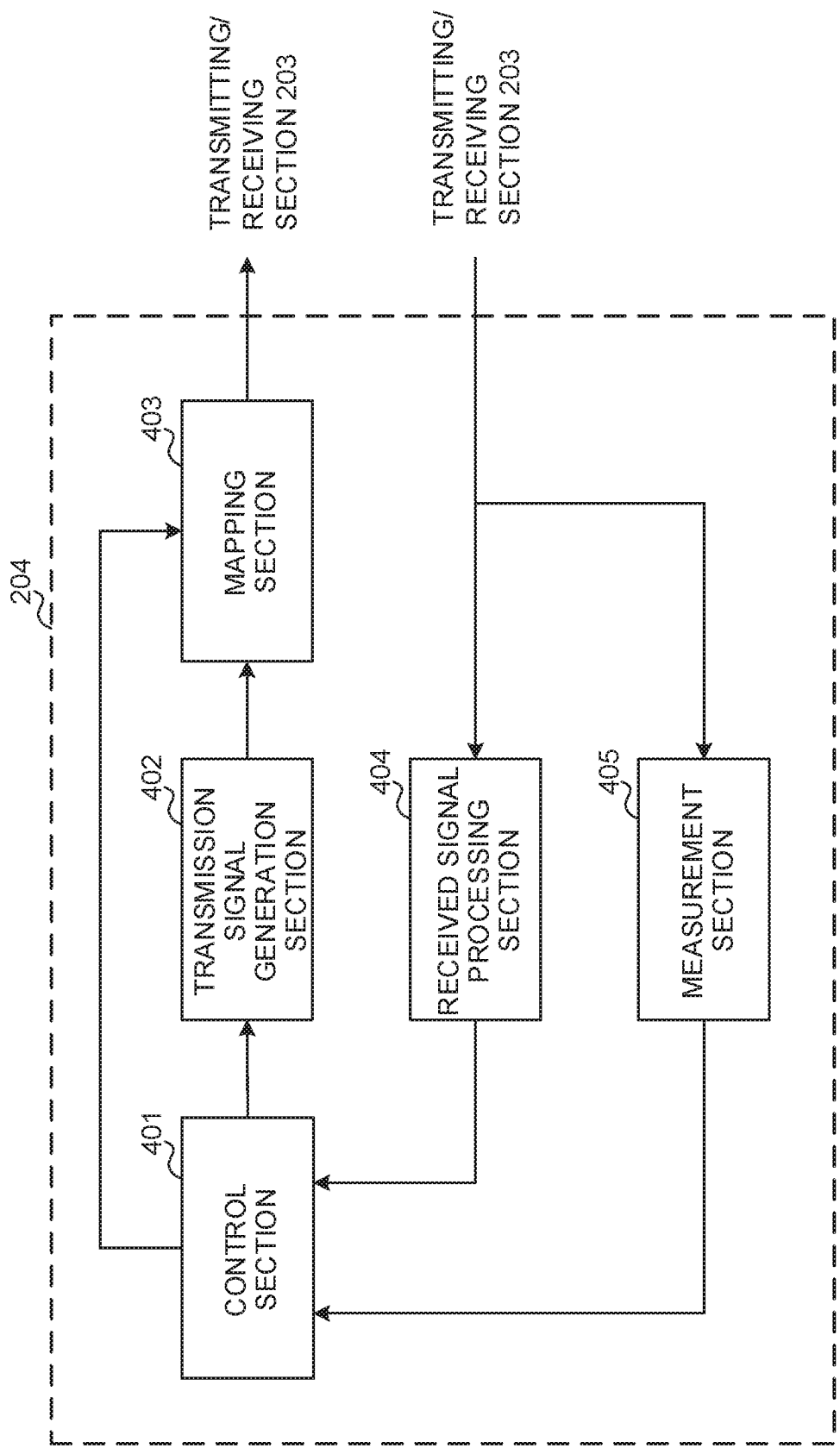
FIG. 18 is a diagram to show an exemplary functional structure of a user terminal according to the present embodiment.

FIG. 18 is a diagram to show an exemplary functional structure of a user terminal according to the present embodiment. Note that, although FIG. 18 primarily shows functional blocks that pertain to characteristic parts of the present embodiment, the user terminal 20 has other functional blocks that are necessary for radio communication as well. As shown in FIG. 18, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

To be more specific, the control section 401 controls receipt of the PDSCH and/or transmission of the PUSCH based on DCI (DL assignments and/or UL grants) from the radio base station 10.

Also, the control section 401 controls the structure of special subframes for the radio base station 10 and/or the user terminals 20. Furthermore, when using special subframes in which the PUSCH is allowed to be transmitted (for example, special subframe configuration 10), the control section 401 may control the timing for scheduling (transmitting) the PUSCH based on these special subframes (the first aspect).

In addition, the control section 401 may control the reference value in the radio base station 10 and/or the user terminal 20 and control the timing k for transmitting the PUSCH based on these reference value (the first aspect).

Furthermore, the control section 401 may control the transmission of the PUSCH by using a table that associates UL grant-receiving subframes #n and PUSCH-transmission timings k, per UL/DL configuration (for example, at least one of the tables shown in FIG. 2A, FIG. 4A, FIG. 5A, FIG. 6A, FIG. 20, FIG. 21 and FIG. 22) (the first aspect). The transmission timings in this table may be determined based on special subframes that are allowed to transmit the PUSCH, and based on predetermined reference values that are lower than 4 ms. The control section 401 may switch the table to look up, when the reference value changes.

In addition, when a plurality of transmission timings k are associated with a receiving subframe #n in the above table, the control section 401 may schedule the transmission of the PUSCH by using a UL grant that applies in common to these transmission timings k or by using the UL grant of each transmission timing (the second aspect).

Also, the control section 401 may specify at least one of these transmission timings k based on at least one of identification information in a UL grant, the HARQ process number in this UL grant, a prospective resource in which this UL grant is detected (the index of a potential DL control channel), and the aggregation level.

In addition, the control section 401 may control the maximum number of HARQ processes based on a special subframe in which PUSCH transmission is allowed and predetermined reference values that are lower than 4 ms (the third aspect). Note that a UL grant that allocates a PUSCH may include an HPN field that indicates an HPN, and the bit length of the HPN field may be an unfixed value that varies with the maximum number of HARQ processes, or may be a fixed value that does not vary with the maximum number of processes.

In addition, the control section 401 may control retransmission of the PUSCH based on a synchronous scheme or an asynchronous scheme.

Furthermore, the control section 401 may also control aperiodic CSI reporting. To be more specific, when a UL grant including a CSI request field value is received, the control section 401 exerts control so that UCI including aperiodic CSI is generated and transmitted based on this CSI request field value. The timing for reporting aperiodic CSI can be controlled in the same way as the above-described PUSCH transmission. As for the timing for reporting aperiodic CSI, the above-described timing for PUSCH transmission may be used.

The control section 401 can be constituted by a controller, a control circuit or control apparatus that can be described based on general understanding of the technical field to which the present invention pertains.

The transmission signal generation section 402 generates UL signals (including UL data, UCI, UL reference signals and so forth) as commanded from the control section 401 (the generation collectively referring to, for example, performing processes such as encoding, rate matching, puncturing, modulation, and/or other processes), and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so forth) for DL signals (DL data, DCI, higher layer control information, and so on). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI-RS) from the radio base station 10, and outputs the measurement results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 19:
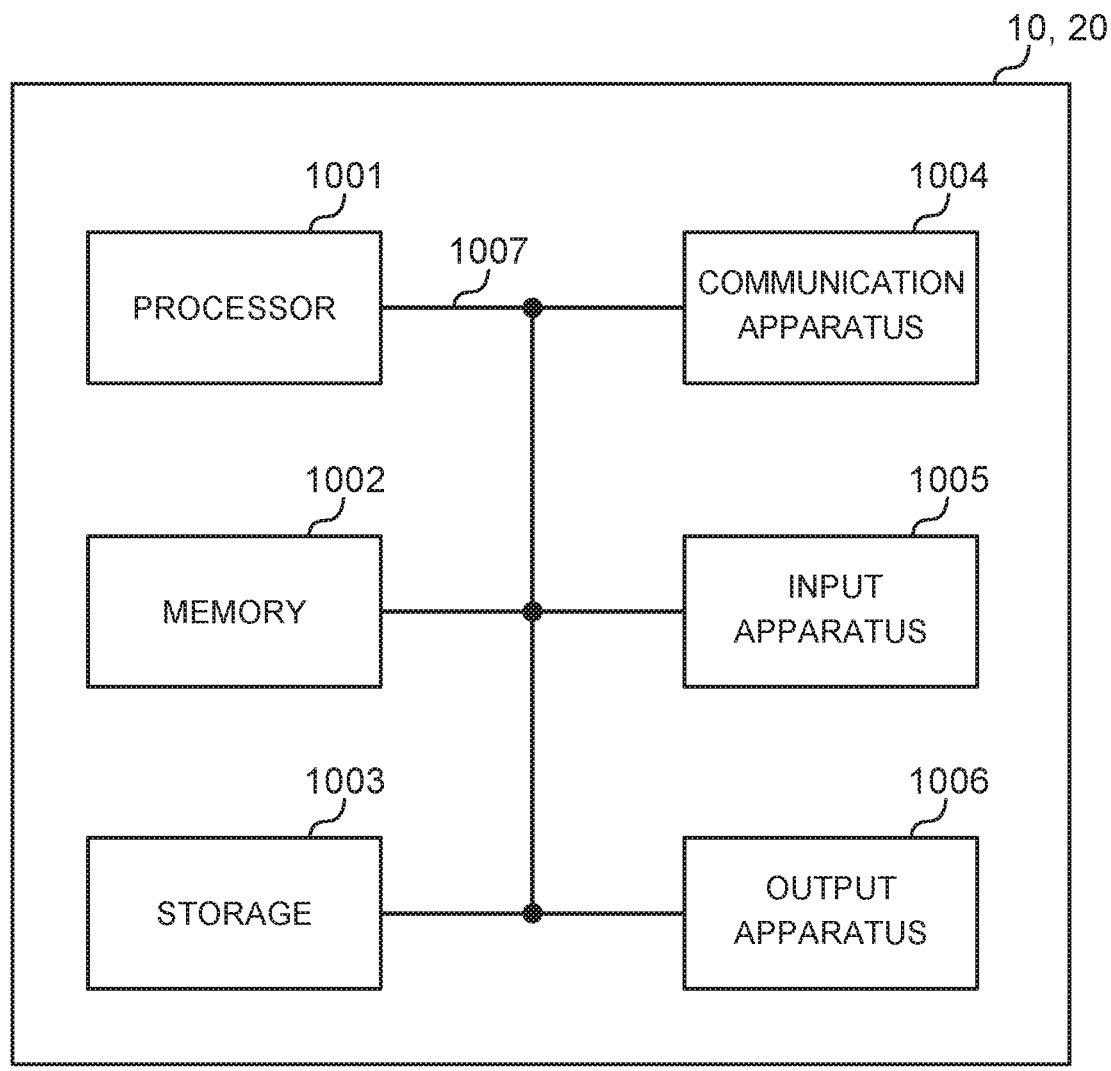
FIG. 19 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 19 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit to use when communicating signals. A radio frame, a subframe, a slot and a symbol may be each called by other equivalent names. For example, one subframe may be referred to as a "transmission time interval (TTI)," or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms. The unit to represent a TTI may be referred to as a "slot," a "minislot," and so forth, instead of a "subframe."

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

Note that a long TTI (for example, a normal TTI, a subframe, and so on) may be interpreted as a TTI that has a time duration greater than 1 ms, and a short TTI (for example, a shortened TTI and/or the like) may be interpreted as a TTI that has a TTI length that is shorter than the TTI length of a long TTI and no less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations such as the number of subframes included in a radio frame, the number of slots included in a subframe, the number of symbols and RBs included in a slot, the number of subcarriers included in an RB, the number of symbols in a TTI, the duration of symbols and the duration of cyclic prefixes (CPs) can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and/or optical regions (both visible and invisible).

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-192338, filed on Sep. 29, 2016, including the specification, drawings and abstract, is incorporated herein by reference in its entirety.

The invention claimed is:

1. A terminal comprising:
a receiver that receives, through higher layer signaling, information that indicates a reference value showing a processing time, and receives downlink control information (DCI) for scheduling an uplink (UL) shared channel; and
a processor that controls transmission of the UL shared channel based on association between a subframe to receive the DCI and a transmission timing of the UL shared channel per UL/downlink (DL) configuration,
wherein the transmission timing is determined based on the information that indicates the reference value and an uplink subframe or a special subframe in which transmission of the UL shared channel is allowed, and
wherein a maximum number of HARQ processes to use for the UL shared channel is determined based on the reference value and whether or not transmission of the UL shared channel is allowed in the special subframe.

2. The terminal according to claim 1, wherein the reference value is 3 ms or less.

3. The terminal according to claim 1, wherein the processor performs aperiodic channel state information (CSI) reporting at the transmission timing of the UL shared channel.

4. The terminal according to claim 1, wherein a bit length of an information field to indicate a HARQ process number is a fixed value that does not vary with the maximum number of HARQ processes.

5. A radio communication method for a terminal, comprising:
receiving, through higher layer signaling, information that indicates a reference value showing a processing time;
receiving downlink control information (DCI) that schedules an uplink (UL) shared channel; and
controlling transmission of the UL shared channel based on association between a subframe to receive the DCI and a transmission timing of the UL shared channel per UL/downlink (DL) configuration,
wherein the transmission timing is determined based on the information that indicates the reference value and an uplink subframe or a special subframe in which transmission of the UL shared channel is allowed, and
wherein a maximum number of HARQ processes to use for the UL shared channel is determined based on the reference value and whether or not transmission of the UL shared channel is allowed in the special subframe.

6. A base station comprising:
a transmitter that transmits, through higher layer signaling, information that indicates a reference value showing a processing time, and transmits downlink control information (DCI) for scheduling an uplink (UL) shared channel; and
a processor that controls reception of the UL shared channel based on association between a subframe to transmit the DCI and a reception timing of the UL shared channel per UL/downlink (DL) configuration,
wherein the reception timing is determined based on the information that indicates the reference value and an uplink subframe or a special subframe in which reception of the UL shared channel is allowed, and
wherein a maximum number of HARQ processes to use for the UL shared channel is determined based on the reference value and whether or not transmission of the UL shared channel is allowed in the special subframe.

* * * * *